7648X
L. RICE.
Potato Digger.
Patented June 29, 1833.
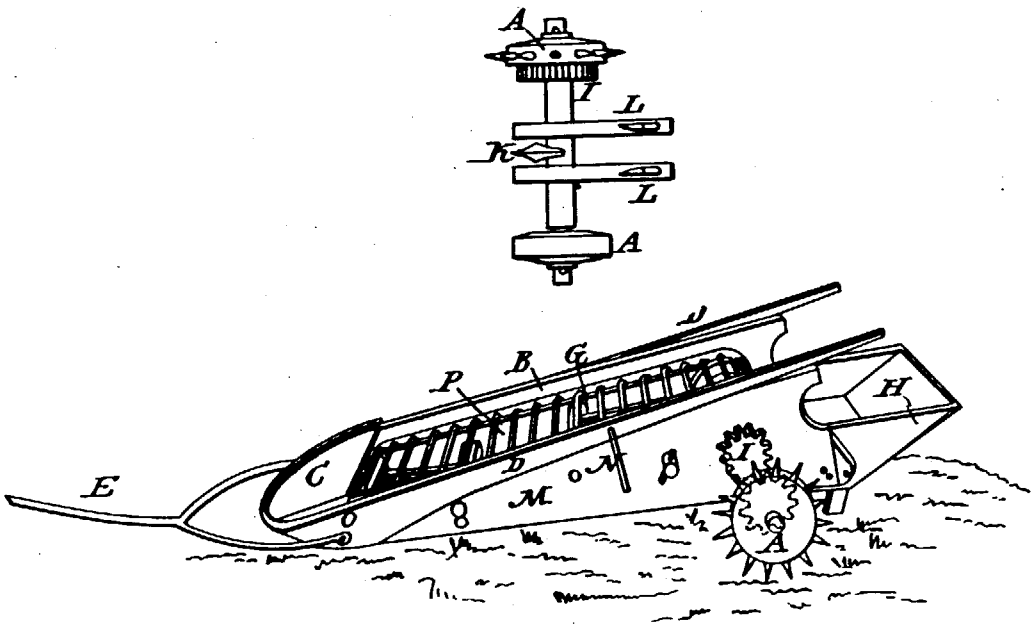

7648X

UNITED STATES PATENT OFFICE.

LEVI RICE, OF ROBBINSTON, MAINE.

MACHINE FOR FURROWING, DROPPING, COVERING, AND DIGGING POTATOES AND EXCAVATING THE EARTH.

Specification forming part of Letters Patent dated June 29, 1833.

*To all whom it may concern:*

Be it known that I, LEVI RICE, of Robbinston, in the county of Washington and State of Maine, have invented a new and useful Improvement in a Machine for Furrowing, Dropping, and Covering Potatoes, and for Digging Potatoes and for Excavating the Earth; and I do hereby declare that the following is a full and exact description of the construction and operation of the said machine as invented or improved by me.

A represents the wheels—the moving power; B, the apron; C, the scoop or shovel; D, the levers to regulate the scoop or shovel; E, the tongue to draw with; F, the rollers to suspend the apron; G, the roller to shake the dirt while passing the apron; H, the box to receive the potatoes; I, the mesh of cogs to propel the apron; K, the plow under the machine to furrow with; L, the two other plows under the machine to cover the furrow when the potato is dropped from the machine; M, the frame to support the running-work; N, the bolts or screws that regulate the levers; O, the bolt or hinge that connects the scoop and lever to the body of the machine; P, the apron that riddles the dirt.

The machine is made of wood or iron, or of part of each, or may be made of other materials.

The machine intended for use may be of different sizes, as may be required for each purpose, the body of the machine being made so as to hold the moving parts, being on two or more wheels connected with an axle-tree having spikes or pins placed into them on purpose for holding in the ground, so as to keep the wheels from slipping, which moves the apron. The apron is moved by a mesh of cogs which is placed on the axle-tree. (A band or endless chain may be applied for the same purpose.) The apron is suspended by two rollers, one of which has a cog-wheel meshing to the moving power. The apron is formed by two endless bands or chains in which the bars are fixed for the purpose of riddling the dirt from the potatoes.

The scoop or shovel by which the earth, &c., is lifted is placed in the forward part of the machine, and is supported and regulated by means of levers or bolts, and may be regulated to go in the ground as deep as is wanted. There is a roller fixed to go in the apron for the purpose of shaking the dirt while passing the riddling-apron. There is a box placed behind to receive the potatoes after the riddle under the machine is fixed, a plow to furrow, and two other plows each side of that one to cover the furrows after the seed is dropped from the machine. The box and plows can be taken off at pleasure.

The machine is to be drawn by horses or oxen.

A model of the machine is delivered on the above plan.

The patentee claims the right of improvement of putting more wheels to the machine for furrowing, dropping, and covering potatoes and corn, and for digging potatoes and for excavating the earth.

LEVI RICE.

Witnesses:
GILBERT BALKAM,
JAMES M. BALKAM.